UNITED STATES PATENT OFFICE.

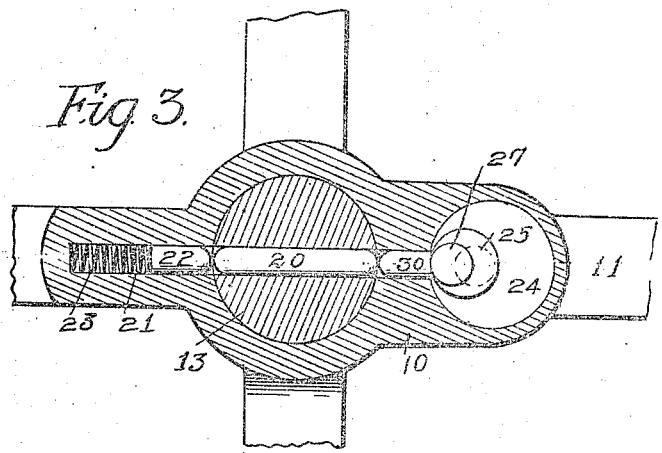
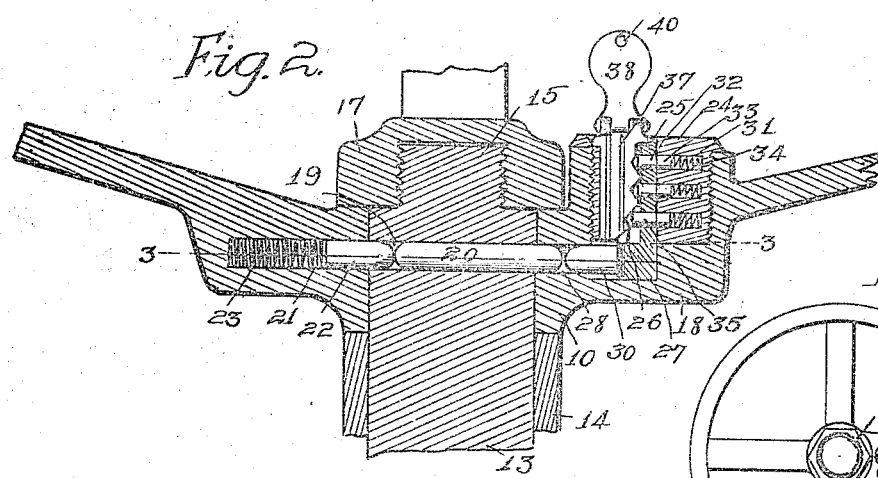
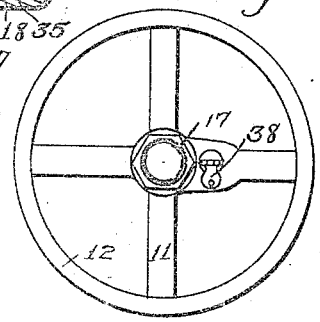
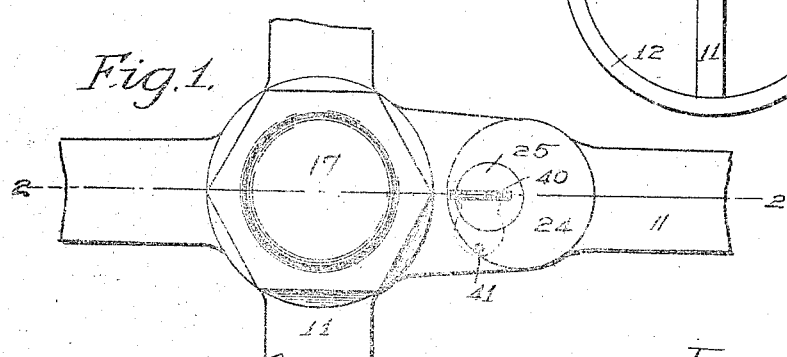

CLAUDE E. MENTZER, OF DES MOINES, IOWA, ASSIGNOR OF ONE-HALF TO CARL B. SMITH, OF DES MOINES, IOWA.

STEERING-WHEEL LOCK.

1,234,369.  Specification of Letters Patent.  Patented July 24, 1917.

Application filed December 9, 1916.  Serial No. 135,982.

*To all whom it may concern:*

Be it known that I, CLAUDE E. MENTZER, a citizen of the United States, and resident of Des Moines, in the county of Polk and State of Iowa, have invented a certain new and useful Steering-Wheel Lock, of which the following is a specification.

The object of my invention is to provide a steering wheel lock of very simple and also of inexpensive construction having parts whereby a steering wheel may be mounted on a post in such manner that when the locking parts are in one position of their movement, the steering wheel will turn freely on the post and will not operate the post, whereas when the locking parts are in another position the steering wheel will be rigidly connected with the post for permitting the proper control thereof.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a top or plan view of a portion of the steering wheel equipped with a lock embodying my invention.

Fig. 2 shows a vertical, central, sectional view through the same, taken on the line 2—2 of Fig. 1.

Fig. 3 shows a horizontal, sectional view taken on the line 3—3 of Fig. 2.

Fig. 4 shows a top or plan view of a steering wheel equipped with my improved lock.

In the accompanying drawings, I have used the reference numeral 10 to indicate generally the hub of a steering wheel having the spokes 11 and the arm 12.

The hub 10 is rotatably mounted upon a steering post 13 which projects at its upper end above the casing 14.

The upper end of the post 13 is reduced in size at 15 and is externally screw-threaded to receive an internally screw-threaded lock cap 17. The hub 10 has a lateral extension 18 at one side to receive the locking bolts and the key cylinder, hereinafter mentioned. The upper part of the post 13 is provided with a transverse slot 19 extending through it. Slidably mounted in the slot 19 is a locking bolt 20.

Formed in the hub 10 at such a point as to register with the slot 19 in one position of the rotation of the hub 13 is a slot 21 in which is slidably received a locking bolt 22. Between the locking bolt 22 and the closed end of the slot 21 is an expansible coil spring 23, which normally tends to move the bolt 22 to position where part of said bolt projects outwardly from the slot 21.

The extension 18 is provided with a suitable opening into which is screwed a cylindrical member 24. In the member 24 is rotatably mounted a key cylinder 25 having the key slot 26 in its upper portion and having the cam 27 in its lower portion.

In the hub 10 is a slot 28 opposite the slot 21 and designed to register with the slot 19 in certain positions of the wheel with relation to the post 13.

Slidably mounted in the slot 28 is a locking pin member 30, engaged at one end by the cam 27 and at the other end by a locking bolt 20 and yieldingly held in engagement with the cam 27 by the action of the spring 23.

In the member 24 are a plurality of openings 31 arranged on a level with similar openings 32 in the cylinder 25, and adapted to register with the openings 32 when the cylinder 25 is in one of its positions.

In the openings 31 are slidably mounted locking bolts 33 which are yieldingly held at the outward limit of their movement by springs 34. In the openings 32 are locking bolts 35. The key slot 26 is designed to receive a key 37 having a hinged handle 38. The key 37 is of the type used in ordinary pin locks. The parts just described are so arranged that when the openings 32 and 31 register with each other, and the key 38 is inserted in the slot 26, the locking bolts 35 will be forced outwardly to position where their outer ends register with the periphery of the cylinder 25, whereupon the cylinder 25 may be rotated by means of the key 37 for causing the cam 27 to move to position where the locking bolt member 30 engages the locking bolt member 20 and forces it longitudinally to position where its ends register with the periphery of the post 13, whereupon the key may be removed and the wheel will be disconnected from the post, so that it cannot be used for operating the steering mechanism of the automobile.

It is preferred that the machine be operated with the key in the slot in the position shown in Fig. 2, when the locking bolt 20 extends into the hub from the post and the locking bolt 22 extends into the post from the hub, for thereby rigidly connecting the wheel with the post.

For preventing accidental movement of the key on account of the vibration of the machine, or otherwise, during the operation of the machine, the handle 38 of the key 37 is hinged, as shown, and is provided with a hole or the like 40, adapted to fit over a pin 41, shown in Fig. 1, which pin is so located as to hold the key in proper position for permitting the wheel to be firmly locked on the post.

The operation of my improved steering wheel lock may be understood from the foregoing description.

Many of the advantages of such a lock are also obvious from the description of the construction and operation.

It will be seen that when the key is moved to proper position and removed, the wheel will simply turn freely on the post and it will be impossible to drive the automobile. On the other hand when the key is in the position, shown in Fig. 2, and particularly when the handle is swung downwardly and secured to the pin 41, the lock parts will be in such position that the wheel is firmly locked on the post. The parts are of extremely durable construction, and the locking mechanism is such as can be readily secured.

It will be obvious that my wheel and lock may be readily installed on an automobile as an attachment, or may be installed during the manufacture of the car.

I have shown in the drawings simply an illustration of one form of a device in which my invention may be embodied, and it is not my intension to limit myself to the particular form here shown, and it is my intention to cover by the patent to be issued upon this application any modified forms of structure or use of mechanical equivalents in the parts of my wheel and lock which may be reasonably included within the scrope of my claims.

I claim as my invention:

1. In a device of the class described, a hollow steering post casing, a steering post mounted therein and projecting beyond the end thereof having a reduced screw-threaded extension on its projecting end, a steering wheel having a hub rotatably mounted on the projecting end of said post and resting upon the upper end of said casing, the projecting end of said post being provided with a transverse opening through it, said hub being provided with opposite openings designed in one position of the rotation of the hub to register with the opening in the post, a locking bolt mounted in said opening in said post, a locking bolt in one of the openings in the hub, a spring in said last named opening for forcing the locking bolt therein toward the post, a locking bolt in the other opening in the hub, locking mechanism in said hub comprising a body, a cylindrical member rotatably mounted therein, having a key opening, a spring lock mechanism in said body and said cylindrical member for locking the cylindrical member, said cylindrical member having a projecting end provided with a cam face adapted to engage the second described locking bolt in the hub.

2. In a device of the class described, a hollow steering post casing, a steering post mounted therein and projecting beyond the end thereof, having a reduced screw-threaded extension on its projecting end, a steering wheel having a hub rotatably mounted on the projecting end of said post and resting upon the upper end of said casing, the projecting end of said post being provided with a transverse opening through it, said hub being provided with opposite openings designed in one position of the rotation of the hub to register with the opening in the post, a locking bolt mounted in said opening in said post, a locking bolt in one of the openings in the hub, a spring in said last named opening for forcing the locking bolt therein toward the post, a locking bolt in the other opening in the hub, locking mechanism in said hub comprising a body, a cylindrical member rotatably mounted therein, having a key opening, a spring lock mechanism in said body and said cylindrical member for locking the cylindrical member, said cylindrical member having a projecting end provided with a cam face adapted to engage the second described locking bolt in the hub, and a cap secured on to the extension of the post, and projecting laterally from said hub.

Des Moines, Iowa, December 2, 1916.

CLAUDE E. MENTZER.

Copies of this patent may be obtained for five cents each, by addressing the "Commissioner of Patents, Washington, D. C."